United States Patent [19]

Sullivan

[11] Patent Number: 4,581,919
[45] Date of Patent: Apr. 15, 1986

[54] RETRIEVABLE HYDROSTATIC TESTING TOOL FOR PRESSURE TESTING TUBING

[76] Inventor: Mitch M. Sullivan, 6774 - 52 Ave., Red Deer, Alberta, Canada, T4N 4K9

[21] Appl. No.: 747,866

[22] Filed: Jun. 24, 1985

[51] Int. Cl.$^4$ ............................................. G01M 3/28
[52] U.S. Cl. .................................... 73/49.5; 73/40.5 R
[58] Field of Search ............. 73/49.5, 49.1, 46, 40.5 R

[56] References Cited

U.S. PATENT DOCUMENTS

| | | | |
|---|---|---|---|
| 2,953,919 | 9/1960 | Potts | 73/49.5 |
| 3,048,998 | 8/1962 | Gilreath | 73/40.5 R |
| 3,173,290 | 3/1965 | Conover | 73/40.5 R |
| 3,354,697 | 11/1967 | Wilkerson | 73/40.5 R |
| 3,478,577 | 11/1969 | Hauk | 73/49.1 |
| 3,499,469 | 3/1970 | Vizuete et al. | 73/49.5 X |
| 4,305,277 | 12/1981 | Ball et al. | 73/40.5 R |
| 4,322,969 | 4/1982 | Ball et al. | 73/40.5 R |

Primary Examiner—Stewart J. Levy
Assistant Examiner—Joseph W. Roskos
Attorney, Agent, or Firm—Ernest Peter Johnson

[57] ABSTRACT

In common with conventional testing tools for this purpose, the present tool incorporates a central mandrel carrying a pair of vertically spaced packers which are expandable by fluid pressure, which mandrel forms a longitudinal bore having an outlet communicating with the annular space between the packers. In contradistinction to the prior tools, the bow spring and slips suspending assembly of the prior tools has been eliminated. Instead, the packers themselves are relied on to suspend or fix the tool in the tubing. To achieve this end, a novel valve assembly has been provided to control the admittance and bleeding off of pressurized fluid into the annular space. The valve assembly is adapted to first admit pressurized fluid into the annular space to set the packers and pressure test the tubing wall between the packers at relatively high pressure, for example 5000 psi. The valve assembly is further adapted to cooperate in bleeding off the pressure from the annular space until it just exceeds that amount required to hold the packers set, say 600 psi; the valve assembly then automatically closes, to trap the 600 psi pressure in the annular space so that the packers maintain the tool in a suspended state. A second stand of tubing can then be added to the tested stand and lowered into the well bore until the second stand's upper end seats in the wellhead. A cable overshot is then used to open the valve assembly, to bleed off the 600 psi, following which the packers collapse and the tool can be retrieved.

3 Claims, 5 Drawing Figures

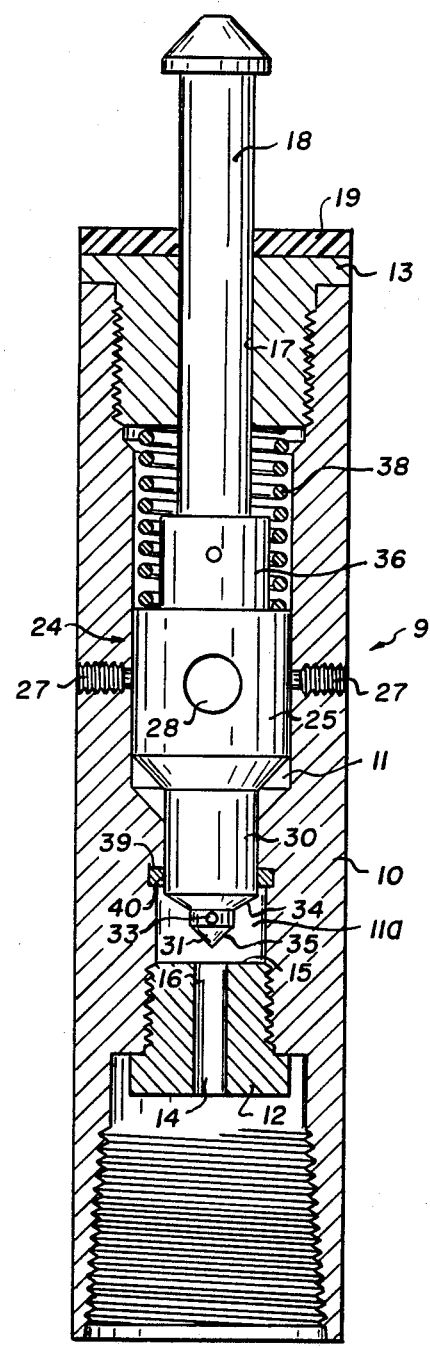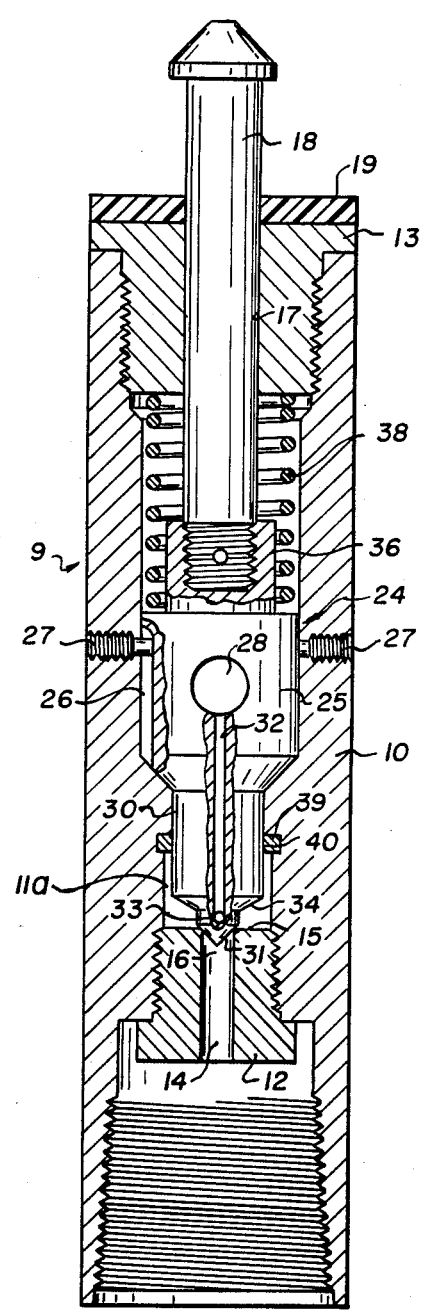

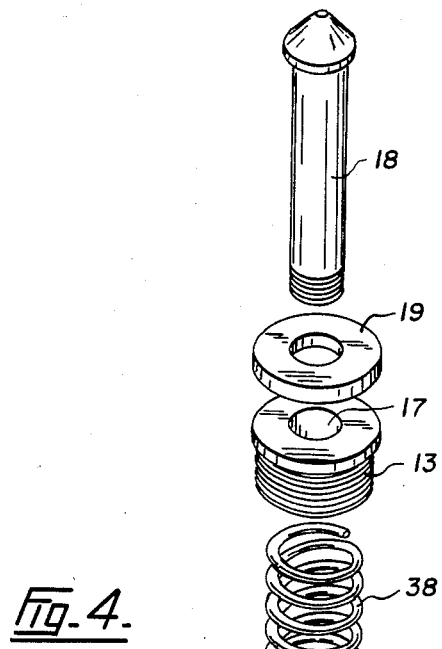
Fig. 4.
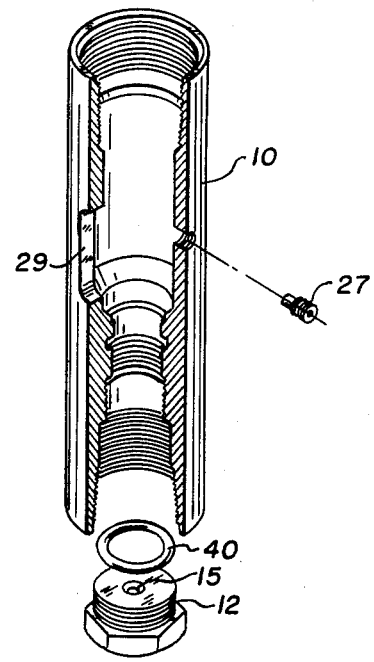

RETRIEVABLE HYDROSTATIC TESTING TOOL FOR PRESSURE TESTING TUBING

BACKGROUND OF THE INVENTION

1. Field of the Invention

The present invention relates to a retrievable hydrostatic testing tool which may be used to pressure test plastic-lined wellbore tubing and the like.

2. Prior Art

It is common practice to pressure test wellbore tubing for leaks as it is run into the wellbore. This involves testing a stand of tubing at a time, as it sits suspended at its upper end by slips seated in the wellhead assembly. In this process, a testing tool is first positioned within the stand. In a broad sense, this tool comprises vertically spaced apart packers, carried by a mandrel, which packers can be expanded against the tubing inner surface, to create a sealed annular space bounded by the tubing, the mandrel, and the packers. The annular space is filled with water introduced through the tool; this water is then pressured up to a high pressure. The pressure is monitored and, if it drops off, a leak is indicated. The still-pressured stand can then be pulled up and the leak visually located.

A prior art hydrostatic testing tool is illustrated in FIG. 1(a). This tool comprises a central mandrel a which may include one or more sucker rods b, to give it length. The mandrel a carries a pair of vertically spaced apart packers c, which may be expanded by fluid pressure applied in the annular space d, to seal against the tubing e. At its lower end, beneath the lowermost packer c, the mandrel a carries a bow spring and slips assembly f. The bow spring and slips assembly f functions, when expanded, to friction-grip the tubing surface to suspend the tool in the tubing. A pressurized fluid inlet assembly h is positioned at the upper end of the mandrel a, above the upper packer c and the wellhead assembly (not shown). This fluid inlet assembly h is designed to be used in conjunction with a pump which supplies water at desired pressure through a conduit i and pessure "gun" or nozzle j. More particularly, the fluid inlet assembly h forms a transverse aperture k for receiving the disengageable nozzle j in sealed relationship. The aperture k communicates with a longitudinal bore 1 extending down through the inlet assembly h. The bore 1 communicates with a longitudinal bore m which extends down through the mandrel a and has an outlet n communicating with the annular space d. A fishing neck o is connected with the upper end of the fluid inlet assembly h, for connection with a cable overshot.

When a first stand of tubing e is to be tested, it is lowered into the wellbore and suspended from the wellhead assembly by slips. The tool, suspended by a cable and overshot attached to the fishing neck o, is lowered into the stand and then pulled up a short distance and set down, to cause the mandrel slips assembly f to expand and grip the tubing wall. This operation is conducted in such a manner that the fluid inlet assembly h ends up protruding above the wellhead. The overshot is released and the nozzle j is inserted into the aperture k of the fluid inlet assembly h. The pump is then started, to fill the annular space d with water and pressure it up. This causes the packers c to expand and seal against the tubing wall. The pressure is then increased to the test pressure (e.g. 5,000 psi) and held there for a short period. If no bleed off in pressure is noted, the stand is judged acceptable. The pressure is then bled off through the conduit i and pump and the nozzle j is removed from the fluid inlet assembly h. A second stand is then added to the first and lowered into the wellbore, with the tool still suspended in the first stand by the slips assembly f. The cable and overshot are subsequently lowered into the second stand, to latch onto the fishing neck o. The cable is then used to pull up on the mandrel a, thereby retracting the slips assembly f, and the testing tool is withdrawn up into the second stand, in preparation for testing it.

Now, in recent years, tubing having an internal plastic lining has achieved wide spread use.

The above described prior art testing tool is not compatible with the lined tubing, as the steel slips assembly f tends to cut the lining. It would therefore be desirable to eliminate the slips assembly from the tool and substitute some other controllable and suitable means for suspending the tool in the tubing.

In U.S. Pat. No. 4,305,277, issued to Ball et al, there is disclosed a hydrostatic testing tool for plastic-lined pipe, wherein a pair of pivoting wings are used to suspend the tool. Other U.S. patents of interest include U.S. Pat. Nos. 4,081,990 (Chatagnier) and 2,981,331 (Arterbury). However, to applicant's knowledge, these tools have not won commercial application.

Applicant set out to design a hydrostatic testing tool which would be suitable for use with plastic-lined tubing. Applicant's earliest prototype tool for testing plastic-lined pipe comprised the previously described tool of FIG. 1, except that the bow spring and slips had been removed. A cable and overshot, previously threaded through the second stand, were attached to the fishing neck and utilized to maintain the tool suspended within the first stand of tubing following its pressure test, while the second stand was attached to the first and both stands were lowered into the wellbore.

The problems attendant with this arrangement were as follows:

the pre-threading of the overshot and cable through each fresh stand, prior to its being added to the tested stand, was a time-consuming operation;

during the addition of each stand, the tool was supported only by the cable, which was vulnerable to shearing; and the 'wickers' on the cable scarred the lining during the required manipulation of the stand while threading the cable and moving the fresh stand into connection with the tested stand.

It therefore became an objective to provide an assembly which would address these problems, unsolved by applicant's own prototype and other earlier units, with a view to alleviating them. Thus the need existed for an assembly characterized by:

the capability of supporting the tool within the tubing without the use of mechanisms damaging to the pipe lining;

the elimination of using the cable and overshot to support the tool while it was being lowered with the tested stand; and the development of an assembly which was fast to re-set.

SUMMARY OF THE INVENTION

The present invention involves substituting a novel valve assembly for the fluid inlet assembly of the previously described hydrostatic testing tool and eliminating the bow spring and slips assembly. The new valve assembly is designed to make it possible to use the soft, elastomer packers themselves as the suspending means.

More particularly, the valve assembly is operative to control the admitting and bleeding off of pressurized fluid to and from the annular space between the packers, in such a fashion that:

in a first step, the pressurized fluid from the pressure source may be admitted through the valve assembly into the annular space and; the pressure built up in said space to set the packers and pressure test the first tubing stand;

in a second step, the pressure internal of the tool may then be bled off through the valve assembly and source, until said pressure reaches a desired value in the annular space, which pressure is just enough to keep the packers set or expanded, at which point the valve assembly is adapted to automatically close or be closed, thereby trapping in the annular space the quantum of pressure needed so that the packers remain expanded and maintain the testing tool fixed in the first stand, thereby permitting a second stand to be added to the first stand and the testing tool to be lowered into the wellbore in the tested stand.

The valve assembly is provided at its upper end with a standard fishing neck, so that an overshot on a cable may be lowered through the second stand to latch onto the neck. The valve assembly is adapted to open when the fishing neck is displaced upwardly, thereby permitting the trapped pressure to bleed off. When this occurs, the packers collapse and free the testing tool for removal up into the second stand for testing thereof.

From the foregoing, it will be noted that it is the pressure-expanded packers which are relied on to suspend the tool in a stand.

In a preferred embodiment, the valve assembly comprises a generally tubular valve body having closed ends and forming an internal chamber. A lower bore or port connects the lower end of the chamber with the bore of the testing tool mandrel.

A slider valve member is disposed in the chamber for movement up or down therein. When the slider valve member is in its lowermost position, it abuts the valve body and seals or closes the lower bore. When the slider valve member is unseated, communication is established between the chamber, the lower bore, the mandrel bore, and the annular space.

The valve assembly comprises means for connecting the pressurized fluid source with the lower end of the chamber. The pressurized fluid source (which may comprise the interconnected pump, conduit, and nozzle previously used with this type of testing tool) is disengageably connectable with said connecting means and is adapted to supply fluid at variable pressure and to bleed if off, as required. Thus pressurized fluid may be brought in to the lower end of the chamber and the pressure therein may be increased or decreased, as needed.

Means, such as a spring, is provided for normally urging the slider valve member to the seated position against the pressure resistance which acts on the bottom surface of said member. This spring closing force is selected so that it is sufficient to seat the slider valve member when the pressure in the annular space is just enough to keep the packers set or expanded. (The work "just" is to be given a broad interpretation. The trapped pressure in the annular space must be sufficient to expand the packers tightly against the tubing wall so they prevent the tool from dropping. But there may be additional trapped pressure in the annular space in excess of this specified minimum.)

The slider valve member is configured to present a surface against which the fluid pressure, admitted to the lower end of the chamber, can act, to apply a lifting force on the slider valve member. This lifting force is directed opposite to the spring force. Thus, when the source is actuated to introduce pressurized fluid into the lower end of the chamber and the pressure in said chamber becomes great enough to overcome the spring force, the slider valve member unseats and the pressurized fluid is admitted into the annular space.

Thus the valve assembly may be characterized as follows:

the slider valve member can be unseated against the spring resistance, by the introduction of sufficient pressure into the lower end of the chamber, to permit the pressurized fluid to reach the annular space;

a desired quantum of pressure can be trapped in the annular space, by bleeding off the pressure in the chamber until the spring causes the slider valve member to close, thereby keeping the packers expanded; and the trapped pressure can be bled off through the source by pulling on the fishing neck with an overshot and cable, to unseat the slider valve member and thereby collapse the packers.

There is thus provided a testing tool which suspends itself using the packers and yet which can be recovered from the first stand after it has been lowered well below ground surface.

Broadly stated, the invention in an apparatus aspect comprises a retrievable hydrostatic testing tool for pressure testing a stand of wellbore pipe for leaks using pressurized fluid from a source, said tool comprising: a valve assembly; a pair of vertically spaced apart packers; and means for carrying the packers, said carrying means being connected at its upper end to the lower end of the valve assembly; said packers being expandable by fluid pressure applied between the packers into sealing and tool-suspending relationship with the inner surface of the stand; said carrying means forming a first bore extending longitudinally therethrough from its upper end and having an outlet located between the packers and communicating with the annular space formed between the carrying means, the packers, and the stand, whereby pressurized fluid may be introduced through the first bore and outlet into the annular space for expansion of the packers and pressure testing of the stand; said valve assembly comprising a valve body forming a closed chamber and a second bore connecting the lower end of the chamber with the first bore, means, associated with the valve body and connectable with the source, for admitting pressurized fluid to the lower end of the chamber and for bleeding off pressurized fluid from the lower end of the chamber, a slider valve member positioned in the chamber and adapted to slide vertically therein between a seated position, in which it contacts the valve body to close the second bore, and an unseated position, in which the second bore is left open to communicate with the lower end of the chamber, the lower end of said valve member being configured to supply a surface against which pressure present in the lower end of the chamber may act to exert an upward force on the valve member, means for interconnecting with an overshot, said means being connected with the slider valve member and extending upwardly out of the valve body in sliding association therewith, and means for normally urging the slider valve member downwardly to the seated position with sufficient force to overcome the upward force generated by fluid pressure present in the lower end of the chamber and the annular space, which fluid pressure is just sufficient to maintain the packers expanded so that they fix the testing tool against slipping downwardly, said urging means being operative to permit the slider valve member to be unseated when said fluid pressure reaches a value substantially greater than said packer expansion pressure but substantially less than the desired testing pressure, whereby pressurized fluid may be admitted into the lower end of the chamber to increase the pressure therein until the slider valve member is unseated against the resistance of the urging means, to thereby admit the pressurized fluid into the annular space to expand the packers and establish a desired testing pressure therebetween, and whereby the fluid pressure in the lower end of the chamber and annular space may thereafter be reduced until the urging means moves the slider valve member to the seated position, thereby trapping fluid, in the annular space which has a sufficient pressure to maintain the packers in the expanded state, whereby the packers function to fix the tool in the stand, thereby making it possible to attach a second stand of pipe to the first stand and to lower the second stand into the wellbore with the testing tool suspended in the first stand and thereafter to lower an overshot through the second stand to grasp the interconnecting means and pull said interconnecting means and attached slider valve member upwardly, to release the trapped pressure and collapse the packers, whereby the tool may be retrieved to the top of the second stand.

Broadly stated, the invention in a method aspect comprises sequentially pressure testing, at a relatively high pressure, stands of tubing in a wellbore, having a wellhead assembly, with pressurized fluid supplied from a source, using a testing tool comprising a pair of vertically spaced apart packers, expandable with pressurized fluid at a relatively low pressure to provide a sealing and tool-suspending relationship with the tubing, said packers being carried by mandrel means having a longitudinal bore extending downwardly from its upper end and communicating with the annular space between the packers, comprising: positioning the tool in a first stand of tubing which is suspended from the wellhead assembly; introducing pressurized fluid into the mandrel bore and annular space and expanding the packers into sealing and tool-suspending relationship with the first stand; increasing the pressure of the fluid until it reaches the desired relatively high testing pressure and maintaining said pressure in the annular space to test the first stand; bleeding off the pressure from the annular space through the tool until the pressure in the annular spacee reaches the relatively low level, at which it is still able to maintain the packers expanded in the sealing and tool-suspending relationship; sealing the low level pressure in the bore and annular space with the testing tool by mechanically actuating said tool to do so, whereby the packers function to suspend the tool; adding a second stand to the first stand and lowering them together into the wellbore and suspending the former from the wellhead assembly; introducing means for latching onto testing tool into the second stand and latching onto said tool and pulling up on said tool with said means to actuate the tool to unseal the bore and bleed off the remaining pressure in the annular space, to thereby collapse the packers; and withdrawing the testing tool into the second stand, for pressure testing thereof.

DESCRIPTION OF THE DRAWINGS

FIG. 2 is a partly sectional side view of the valve assembly showing the slider valve member unseated;

FIG. 3 is a view similar to that of FIG. 2, showing the slider valve member seated; and FIG. 4 is a perspective, exploded view of the valve assembly.

DESCRIPTION OF THE PREFERRED EMBODIMENT

Figures 1A, 1B:
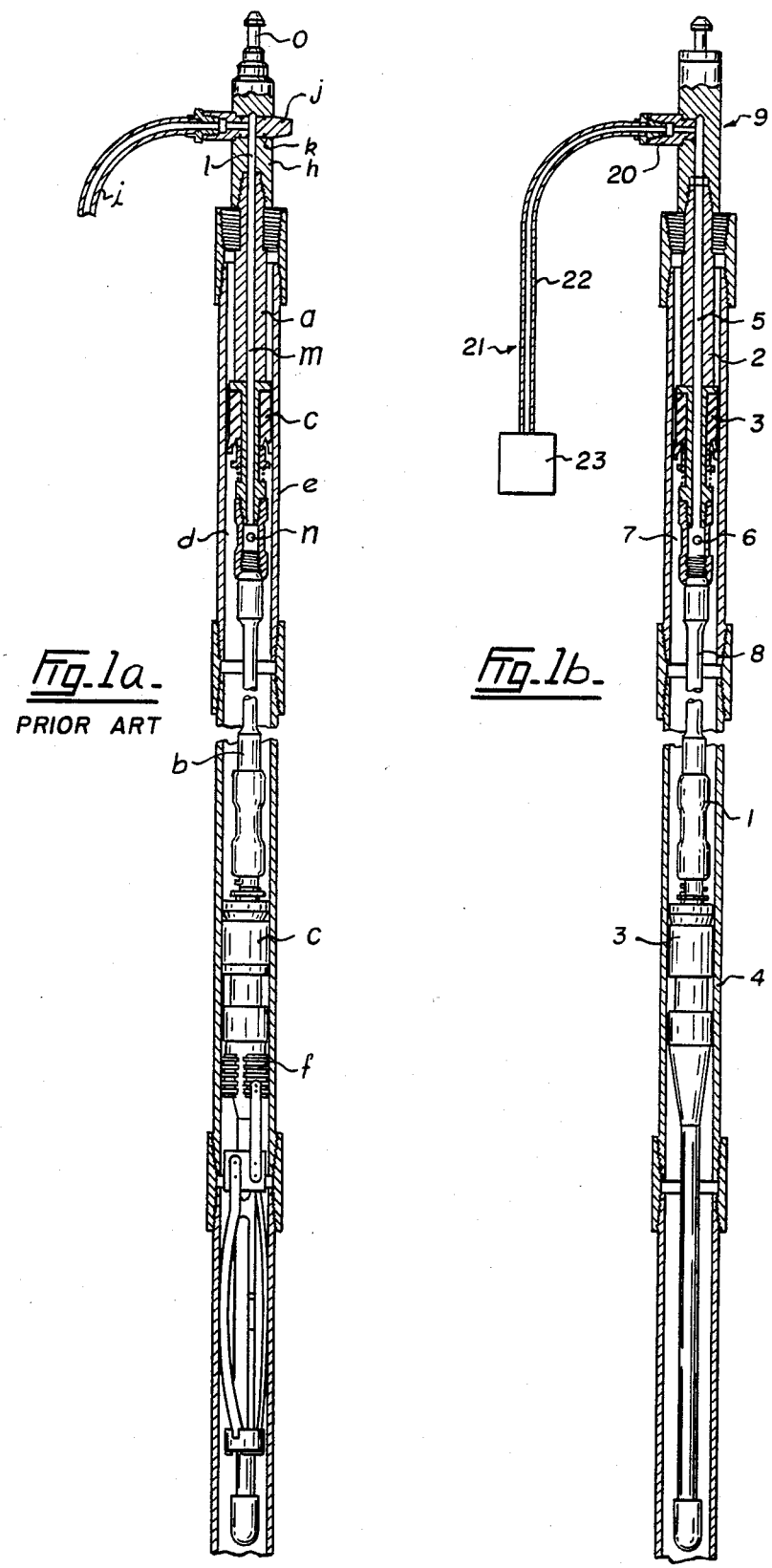
FIG. 1(a) is a side view of a testing tool in accordance with the prior art, positioned in a stand of tubing and connected to a source of pressurized fluid.
FIG. 1(b) is a view similar to that of FIG. 1(a), showing a testing tool in accordance with the present invention.

The testing tool 1 is illustrated in FIG. 1b. It comprises a mandrel 2 carrying a pair of vertically spaced packers 3 of conventional design. The packers 3 are capable of being expanded outwardly, by fluid pressure, into tight contact with the inner surface of the tubing 4. The mandrel 2 forms a longitudinal bore 5 extending from its upper end and terminating at an outlet 6 which communicates with the annular space 7 formed between the mandrel, packers and tubing. The mandrel 2 is shown to include one or more sucker rods 8, to provide length.

A valve assembly 9 is threaded at its lower end onto the upper end of the mandrel 2.

Said valve assembly 9 comprises a generally tubular valve body 10 forming a longitudinal bore or chamber 11. The valve body 10 is internally threaded at each of its ends. An externally threaded plug 12 is screwed into the lower end of the valve body 10 and provides closure of the lower end of the chamber 11. A second plug 13 is screwed into the upper end of the valve body 10, to provide top closure of the chamber 11. The plugs 12, 13 form part of the valve body 10.

The lower plug 12 forms a longitudinally extending bore 14, which functions to connect the lower end 11a of the chamber 11 with the mandrel bore 5. Thus there is communication between the lower end of the chamber 11 and the annular space 7 through the bores 14, 5.

The lower plug 12 further forms a valve seat 15 at the inlet 16 of the bore 14.

The upper plug 13 also forms a central bore 17 extending therethrough for accommodating the fishing neck 18. The fishing neck 18 is of conventional design and is adapted to be grappled onto by a cable overshot (not shown). The upper portion 19 of the plug 13 is formed of neoprene, to provide a seal around the fishing neck 18.

A slot extends transversely through the side wall of the valve body 10, to permit the nozzle 20, of a pressurizes fluid supply source 21, to extend therethrough. The source 21 includes a conduit 22, connecting with the nozzle 20, and a pump 23 connected to the conduit 22. The source 21 is capable of supplying water and pressurizing it, as well as bleeding the pressure off, as required.

A slider valve member 24 is positioned in the chamber 11 and is adapted to slide vertically therein between a seated position, shown in FIG. 3, and an unseated position, shown in FIG. 2.

The slider valve member 24 comprises a thick central portion 25 having a vertical keyway 26 cut in its side surface, for cooperating with a key 27, carried by the valve body 10, to guide the member 24 in its vertical travel and prevent rotation thereof.

The valve member's central portion 25 further forms a transversely extending aperture 28, for receiving the nozzle 20. The nozzle 20 is of conventional design, having an outlet sealed by O-ring seal 29. Said nozzle 20 is disengageable, in the sense that it can be quickly inserted or withdrawn, as required.

At its lower end, the slider valve member 24 has a portion 30 of reduced diameter. The portion 30 ends with a tapered portion 31 which is adapted to seat with a liquid-tight seal in the valve seat 15, to close the inlet 16 of the lower bore 14.

A bore 32 extends downwardly from the aperture 28 through the valve member's central and lower portions 25, 30 and communicates with the lower end 11a of the chamber 11 via an outlet 33 formed in the tapered portion 31. From the foregoing, it will be understood that pressurized fluid introduced through the nozzle 20 can always enter the lower end 11a of the chamber 11 via the bore 32 and outlet 33.

The reduced diameter and tapered portions 30, 31 of the slider valve member 24 present surfaces 34, 35 against which pressure, present in the lower end 11a of the chamber 11, can act to apply lifting force on the valve member 24.

The slider valve member 24 further includes an upper portion 36 of reduced diameter that is connected by a pin (not shown) with the lower end of the fishing neck 18. The fishing neck 18 extends upwardly out of the chamber 13 through the upper plug bore 17 and is slidable therein.

A spring 38 is mounted around the upper portion 36 of the slider valve member 24 and extends between the upper plug 13 and the shoulder of the central portion 25. The spring 38 is selected to apply sufficient downwardly directed force on the slider valve member 24 to hold it in the seated position, wherein the tapered portion 31 closes the lower bore inlet 16, when the pressure in the lower end 11a of the chamber 11 and in the annular space 7 is at least sufficient to retain the packers 3 in the expanded, tool-suspending state. The spring 38 is further characterized in that it may be compressed when the pressure in the lower end 11a of the chamber 11, acting on the surfaces 34, 35, reaches a value substantially greater than the pressure required for packer expansion but substantially less than the desired testing pressure. Stated otherwise, the spring 38 can be compressed when the pressure in the lower end 11a of the chamber 11 is significantly greater than that value just needed in the annular space 7 to keep the packers 3 in the tool-suspending state.

The chamber 11 is reduced in diameter by an inwardly projecting shoulder 39 of the valve body 10. An O-ring 40 seats against the shoulder 39 and provides a seal around the slider valve member portion 30. The O-ring 40 thus prevents fluid escape along the outside of the valve member 24. The lower end 11a of the chamber 11 is thus a sealed sub-chamber with the only openings thereinto being the slider valve member bore 32 and the lower closure bore 14. The slider valve member 24 itself forms part of the containing surface of this sub-chamber 11a.

In operation, the testing tool 1 is inserted into a stand of tubing to be tested, using a cable overshot to suspend it. The nozzle 20 is then inserted into the aperture 28 and pressurized water is injected through the valve bore 32 and outlet 33 into the lower end 11a of the chamber 11. When the pressure acting on the pressure surfaces 34, 35 is sufficiently high, the spring 38 begins to compress and the slider valve member 24 unseats. This opens the lower bore 14 as the tapered portion 31 moves off the valve seat 15. The pressurized fluid moves through the lower bore 14 and mandrel bore 5 into annular space 7, simultaneously expanding the packers 3 into sealing and suspending relationship with the stand's inner surface. The pressure is increased, using the pump 23, until it reaches the desired test pressure, at which point the pump 23 is stopped to shut in the pressure. When the test is complete, the pressure is bled off through the pump 23. When the pressure in the lower end 11a of the chamber 11 reaches a value just greater than the pressure needed in the annular space 7 to keep the packers 3 capable of suspending the tool 1, the spring 38 expands and urges the slider valve member 24 to the seated position, in which it abuts the valve body 10 as the tapered portion 31 seats in the valve seat 15 and closes the lower bore 14. At this stage, the required pressure, to keep the packers 3 expanded, is trapped in the annular space 7. The pressure may then be completely bled off from the lower end 11a of the chamber 11 through the pump 23; the nozzle 20 may then be removed, while the trapped pressure keeps the packers 3 expanded. A second stand of tubing is then screwed into the first and the resulting string is lowered into the wellbore until the top of the second stand can be seated in slips in the wellhead. A cable overshot is lowered through the second stand to grasp the fishing neck 18. By pulling upwardly on the fishing neck, the slider valve member 11 is caused to move up off the valve seat 15. The pressure trapped in the annular space 7 bleeds off through the opening in the side wall of the valve body 10 and the packers 3 collapse. The tool 1 can then be pulled to surface for re-use.

The scope of the invention is set forth in the claims which now follow.

The embodiments of the invention in which an exclusive property or privilege is claimed are defined as follows:

1. A retrievable hydrostatic testing tool for pressure testing a stand of wellbore pipe for leaks using pressurized fluid from a source, said tool comprising:

a valve assembly;

a pair of vertically spaced apart packers;

and means for carrying the packers, said carrying means being connected at its upper end to the lower end of the valve assembly;

said packers being expandable by fluid pressure applied between the packers into sealing and tool-suspending relationship with the inner surface of the stand;

said carrying means forming a first bore extending longitudinally therethrough from its upper end and having an outlet located between the packers and communicating with the annular space formed between the carrying means, the packers, and the stand, whereby pressurized fluid may be introduced through the first bore and outlet into the annular space for expansion of the packers and pressure testing of the stand;

said valve assembly comprising a valve body forming a closed chamber and a second bore connecting the lower end of the chamber with the first bore, means, associated with the valve body and connectable with the source, for admitting pressurized fluid to the lower end of the chamber and for bleeding off pressurized fluid from the lower end of the chamber, a slider valve member positioned in the chamber and adapted to slide vertically therein between a seated position, in which it contacts the valve body to close the second bore, and an unseated position, in which the second bore is left open to communicate with the lower end of the chamber, the lower end of said valve member being configured to supply a surface against which pressure present in the lower end of the chamber may act to exert an upward force on the valve member, means for interconnecting with an overshot, said means being connected with the slider valve member and extending upwardly out of the valve body in sliding association therewith, and means for normally urging the slider valve member downwardly to the seated position with sufficient force to overcome the upward force generated by fluid pressure present in the lower end of the chamber and the annular space, which fluid pressure is just sufficient to maintain the packers expanded so that they fix the testing tool against slipping downwardly, said urging means being operative to permit the slider valve member to be unseated when said fluid pressure reaches a value substantially greater than said packer expansion pressure but substantially less than the desired testing pressure, whereby pressurized fluid may be admitted into the lower end of the chamber to increase the pressure therein until the slider valve member is unseated against the resistance of the urging means, to thereby admit the pressurized fluid into the annular space to expand the packers and establish a desired testing pressure therebetween, and whereby the fluid pressure in the lower end of the chamber and annular space may thereafter be reduced until the urging means moves the slider valve member to the seated position, thereby trapping fluid, in the annular space, which has a sufficient pressure to maintain the packers in the expanded state, whereby the packers function to fix the tool in the stand, thereby making it possible to attach a second stand of pipe to the first stand and to lower the second stand into the wellbore with the testing tool suspended in the first stand and thereafter to lower an overshot through the second stand to grasp the interconnecting means and pull said interconnecting means and attached slider valve member upwardly, to release the trapped pressure and collapse the packers, whereby the tool may be retrieved to the top of the second stand.

2. A retrievable hydrostatic testing tool for pressure testing a stand of wellbore pipe for leaks using pressurized fluid from a source, said tool comprising:

a valve assembly;

a pair of vertically spaced apart packers;

and means for carrying the packers, said carrying means being connected at its upper end to the lower end of the valve assembly;

said packers being expandable by fluid pressure applied between the packers into sealing and tool-suspending relationship with the inner surface of the stand;

said carrying means forming a first bore extending longitudinally therethrough from its upper end and having an outlet located between the packers and communicating with the annular space formed between the carrying means, the packers, and the stand, whereby pressurized fluid may be introduced through the first bore and outlet into the annular space for expansion of the packers and pressure testing of the stand;

said valve assembly comprising a generally tubular valve body forming a chamber, said valve body including means, extending across the lower end of the chamber, for providing closure thereof, said closure means forming a second bore for connecting the chamber with the first bore, said valve body side wall forming a transversely extending opening through which a nozzle, connected with the source, may extend for supplying pressurized fluid at variable pressure and for bleeding off said pressurized fluid;

a slider valve member disposed in the chamber for sliding movement in a vertical direction between a seated position, in which it contacts the closure means to seal the second bore, and an unseated position, in which it is displaced from said closure means and the second bore is left open to communicate with the lower end of the chamber, the lower end of said valve member being configured to supply a surface against which pressure present in the lower end of the chamber may act to exert an upward force on the valve member, said slider valve member forming a transversely extending aperture adapted to disengageably receive the nozzle in sealed relationship therewith, whereby said source may communicate with said aperture, said slider valve member forming a third bore extending longitudinally thereof and communicating with the aperture, said third bore having an outlet at its lower end which is adapted to communicate with the lower end of the chamber, means, forming part of the valve body and extending across the upper end of the chamber, for providing closure thereof, means for interconnecting with an overshot, said means being connected with the slider valve member and extending upwardly through said upper closure means, in sliding association therewith, a spring for normally urging the slider valve member to the seated position with a pre-determined force, said spring being adapted to hold the slider valve member in the seated position when the fluid pressure in the lower end of the chamber and annular space is at least sufficient to retain the packers in the expanded state, but said spring being adapted to be compressed to permit the slider valve member to be unseated when the fluid pressure in the lower end of the chamber reaches a value substantially greater than said packer expansion pressure but substantially less than the desired testing pressure, and seal means, positioned between the slider valve member and the body, for sealing the lower end of the chamber, whereby the conduit means may be connected with the slider valve member to supply fluid under increasing pressure to the lower end of the chamber so as to unseat said slider valve member against the resistance of the spring, to thereby open the second bore and admit the pressurized fluid into the annular space to expand the packers and establish a desired testing pressure between the packers, and whereby the fluid pressure in the lower end of the chamber and annular space may thereafter be bled off through said nozzle and source until the spring moves the slider valve member to the seated position, thereby trapping fluid, in the annular space, which fluid has a sufficient pressure to maintain the packers in the expanded state, whereby the packers function to fix the tool in the stand, thereby making it possible to attach a second stand of pipe to the first stand and to lower the second stand into the wellbore with the testing tool suspended in the first stand and thereafter to lower an overshot through the second stand to grasp the interconnecting means and pull said interconnecting means and attached slider valve member upwardly against the resistance of the spring to release the trapped pressure and collapse the packers, whereby the tool may be retrieved to the top of the second stand.

3. A method for sequentially pressure testing, at a relatively high pressure, stands of tubing in a wellbore, having a wellhead assembly, with pressurized fluid supplied from a source, using a testing tool comprising a pair of vertically spaced apart packers, expandable with pressurized fluid at a relatively low pressure to provide a sealing and tool-suspending relationship with the tubing, said packers being carried by mandrel means having a longitudinal bore extending downwardly from its upper end and communicating with the annular space between the packers, comprising:

positioning the tool in a first stand of tubing which is suspended from the wellhead assembly;

introducing pressurized fluid into the mandrel bore and annular space and expanding the packers into sealing and tool-suspending relationship with the first stand;

increasing the pressure of the fluid until it reaches the desired relatively high testing pressure and maintaining said pressure in the annular space to test the first stand;

bleeding off the pressure from the annular space through the tool until the pressure in the annular space reaches the relatively low level, at which it is still able to maintain the packers expanded in the sealing and tool-suspending relationship;

sealing the low level pressure in the bore and annular space with the testing tool by mechanically actuating said tool to do so, whereby the packers function to suspend the tool;

adding a second stand to the first stand and lowering them together into the wellbore and suspending the former from the wellhead assembly;

introducing means for latching onto the testing tool into the second stand and latching onto said tool and pulling up on said tool with said means to actuate the tool to unseal the bore and bleed off the remaining pressure in the annular space, to thereby collapse the packers; and withdrawing the testing tool into the second stand, for pressure testing thereof.

* * * * *